United States Patent [19]

Wagner et al.

[11] 4,250,740
[45] Feb. 17, 1981

[54] METHOD FOR EVALUATING EFFECTIVENESS OF TRACK LINK SEALS

[75] Inventors: Joseph F. Wagner; Donald E. Westemeier, both of Dubuque, Iowa

[73] Assignee: Deere & Company, Moline, Ill.

[21] Appl. No.: 65,697

[22] Filed: Aug. 10, 1979

[51] Int. Cl.³ .............................................. G01M 3/20
[52] U.S. Cl. ...................................... 73/40.7; 73/49.8
[58] Field of Search ...................... 73/40.7, 49.8, 49.7; 116/264

[56] References Cited

U.S. PATENT DOCUMENTS

| 1,915,965 | 6/1933 | Williams | 116/264 |
| 2,393,996 | 2/1946 | Layton | 73/40.7 X |
| 3,006,861 | 10/1961 | Browning | 73/40.7 X |

FOREIGN PATENT DOCUMENTS 382548  7/1971  U.S.S.R. ..................... 73/40.7

Primary Examiner—Gerald Goldberg
Assistant Examiner—Joseph W. Roskos

[57] ABSTRACT

The pivot or hinge joints of a track chain assembly of a track laying tractor each include lubricant cavities which are sealed by a pair of spaced apart seals. The seals each include a resilient rubber load member and a relatively rigid polyurethane seal member having an annular sealing lip which is biased into place by the load member when the seal is installed. The effectiveness of the seals is tested by adding a coloring agent or dye to the lubricant in the cavities being sealed, by operating the assembled chain in a mud box for a predetermined time, by disassembling the chain and then by inspecting the seal members to see whether or not surfaces thereof normally outside the sealed cavity have been contacted by leaking lubricant as evidenced by the presence of the dye.

1 Claim, 2 Drawing Figures

METHOD FOR EVALUATING EFFECTIVENESS OF TRACK LINK SEALS

The present invention relates to methods for evaluating the effectiveness of seals for sealing lubricant in and excluding foreign material from lubricant cavities of articulated joints and more specifically relates to such methods as applied to seals including a relatively rigid, abrasion resistant, polyurethane seal ring and intended for use in joints subjected to severe operating environments, such as those encountered by track chains of track laying tractors.

Conventionally, the procedure for determining the effectiveness of seals used in track laying tractor track chain joints has been to subject the seals to what is known as a mud box test. In this test, an assembled track chain is supported and driven within an enclosed box containing a slurry of water, soil and sand. After a predetermined time, the chain is removed from the slurry and the joints are inspected to determine if seal leakage has occurred. While this method is effective in divulging those seals which have failed completely, it has not been satisfactory in regard to revealing when seals are leaking small amounts of lubricant.

SUMMARY OF THE INVENTION

According to the present invention, there is provided a novel method of evaluating the effectiveness of those lubricant cavity seals which include a polyurethane sealing ring.

A broad object of the invention is to provide a method for testing or evaluating lubricant cavity seals which will reveal any seal surface across which lubricant leakage has occurred.

A more specific object of the invention is to provide a method for testing or evaluating lubricant cavity seals wherein a coloring agent or dye is added to the lubricant in the cavity in order that areas of leakage of lubricant past the seal will be evidenced by the presence of dye thereon.

These and other objects will become apparent from a reading of the following description, together with the appended drawing.

DESCRIPTION OF THE PREFERRED EMBODIMENT

Figure 1:
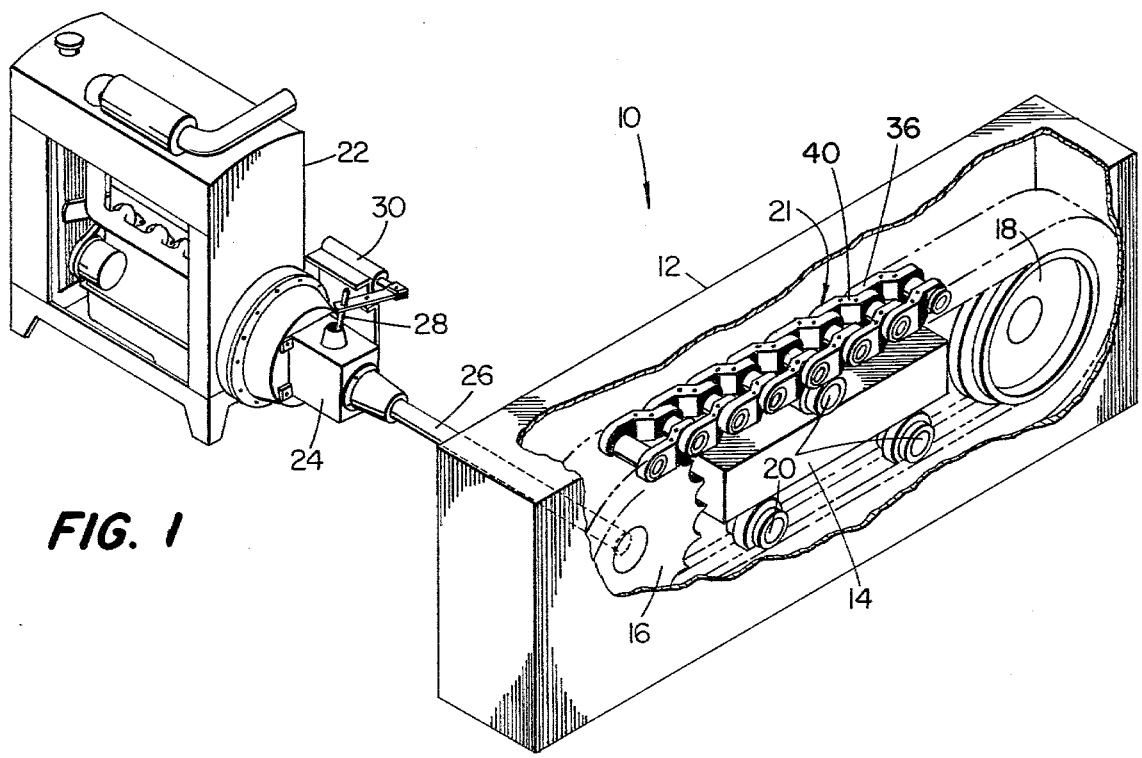
FIG. 1 is perspective view of a schematic representation of a mud box assembly for testing the effectiveness of track link seals.

Referring now to FIG. 1, therein is shown a mud box assembly 10 including an elongate box 12 in which is located a track frame 14 supporting a drive sprocket 16 at one end thereof, an idler wheel 18 at the other end thereof and various rollers 20 between the ends thereof. A track laying tractor chain 21 is received about the sprocket 16 and idler wheel 18. A prime mover 22 is positioned beside the box 12 adjacent the end containing the drive sprocket 16 and is coupled to a reversible transmission 24 having a output shaft 26 coupled for driving the sprocket 16. The transmission 24 has a shift lever 28 coupled thereto which is operable to opposite sides of a neutral position for effecting forward and reverse driving of the sprocket 16. An air-operated actuator 30 is coupled to the lever 28 and a control (not shown) of a known construction is coupled to the actuator for causing the latter to periodically shift the lever 26 back and forth between forward and reverse drive effecting positions with a predetermined hesitation at the neutral position, as is well known in the art, and the purpose of which will be described hereinbelow.

Figure 2:
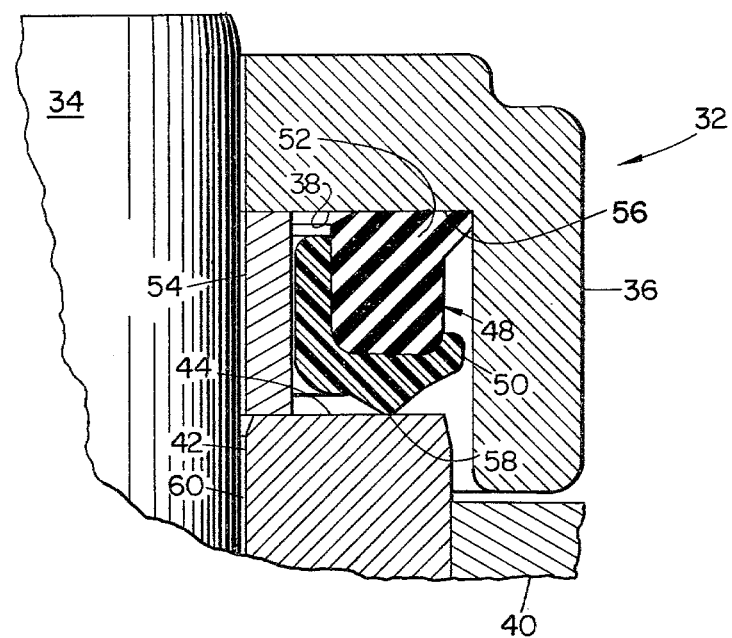
FIG. 2 is a sectional view of a portion of a track link joint showing one end of the lubricant cavity defined by the track links, pin and bushing and sealed by a seal of the type that is particularly suited to be tested in accordance with the method of the present invention.

Referring now to FIG. 2, therein is shown an end portion of a typical track link joint 32 including a pivot pin 34 press fit into a hole provided in an end of an outer track link 36. The inner face of track link 36 is provided with a counterbore 38 which surrounds the pin 34. Loosely received on the pin 34 is a bushing 42, which is press fit into an end of an inner track link 40 and has an end 44 received in and cooperating with the counterbore 38 to define an annular seal cavity. An annular seal 48 is located in the seal cavity and includes a seal member 50 made of a relatively rigid, abrasion resistant material such as polyurethane and a load member 52 made of an elastic material such as rubber. An annular metal spacer 54 is located between the seal 48 and the pin 34 so as to maintain a predetermined minimum space between the bushing end 44 and a bottom surface 56 of the counterbore 38.

The seal member 50 is generally L-shaped in cross-section and, relative to the pin 34, includes an axial leg arranged adjacent to the spacer 54 and a radial leg arranged adjacent to the end 44 of the bushing 42. The radial leg is provided with a pair of surfaces which converge toward the bushing end 44 and define an annular seal band 58. The load member 52 is compressed between the bottom surface 56 of the counterbore 38 and the radial leg of the seal member 50 and accordingly urges the seal band 58 into sealing engagement with the bushing end 44. Thus, it will be appreciated that the seal 48 cooperates with the counterbore 38, bushing end 44 and a clearance space 60 existing between the pin 34 and bushing 42 to define a lubricant cavity having a fill passage (not shown) leading thereto.

In accordance with the present invention, the effectiveness of the seals 48 is tested or evaluated by adding a quantity of a coloring agent or dye to a supply of lubricant which is used to fill the lubricant cavities of the joints of the chain 21 and then by operating the chain in the mud box assembly 10. One example of a coloring agent suitable for such addition to lubricant is oil red B liquid organic dye in Xylene, a product currently being marketed by the Dupont Corporation.

Briefly, the operation of the invention is as follows. Assuming that it is desired to evaluate the effectiveness of a track link seal of a type including a relatively rigid abrasion resistant seal member such as the seal member 50 described hereinabove, a length of chain for use in the mud box assembly 10 would be assembled and the lubricant cavities of the joints of the chain would be filled with a lubricant containing a dye. The assembled chain would then be wrapped about the sprocket 16 and idler wheel 18 and a slurry comprising water, soil and sand or the like would be put into the mud box 12 to a depth capable of insuring the immersion of the chain. Next, the prime mover 22 would be started and the controls for the actuator 30 energized to periodically effect shifting of the transmission 24 back and forth between forward and reverse driving modes while hesitating in the neutral position for a predetermined period of time sufficient to allow the slurry to be ingested by any joints which may not be properly sealed. After a preselected number of hours of operation, the prime mover 22 would be stopped and the chain removed from the mud box 12 and disassembled, the effectiveness of the seals being determined by examining the seal members thereof to observe what surfaces are dyed, with the presence of dye on seal surfaces or on surfaces normally outside of the lubricant cavity indicating seal leakage.

I claim:

1. A method for evaluating the effectiveness of an annular seal including a seal member comprising a relatively rigid, abrasion resistant material and installed in a track link assembly such as to prevent the flow of lubricant from and foreign material to a cavity defined by the assembly, comprising: adding a dyeing agent to the lubricant in the cavity, operating the track link assembly in a mud bath for a preselected period of time and removing the link assembly from the mud bath and disassembling the assembly for the purpose of observing the areas of the seal member colored by the dye to thereby determine if the seal member has any areas indicating that lubricant has leaked thereby.

* * * * *